(12) United States Patent
Lin et al.

(10) Patent No.: US 11,500,492 B2
(45) Date of Patent: Nov. 15, 2022

(54) METHOD OF CONTROLLING DISPLAY PANEL AND RELATED CONTROL CIRCUIT

(71) Applicant: NOVATEK Microelectronics Corp., Hsin-Chu (TW)

(72) Inventors: Yi-Ying Lin, Hualien County (TW); Chih-Chang Lai, Taichung (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/213,154

(22) Filed: Mar. 25, 2021

(65) Prior Publication Data
US 2021/0389863 A1 Dec. 16, 2021

Related U.S. Application Data

(60) Provisional application No. 63/039,468, filed on Jun. 16, 2020.

(51) Int. Cl.
*G06F 3/041* (2006.01)
*G06V 40/12* (2022.01)
*G09G 3/20* (2006.01)
*G06V 40/13* (2022.01)

(52) U.S. Cl.
CPC ...... *G06F 3/04184* (2019.05); *G06V 40/1318* (2022.01); *G09G 3/20* (2013.01)

(58) Field of Classification Search
CPC ... G06F 3/04184; G06V 40/1318; G09G 3/20
See application file for complete search history.

(56) References Cited

U.S. PATENT DOCUMENTS

| | | | | |
|---|---|---|---|---|
| 2017/0336909 A1* | 11/2017 | Song | .................. | G06F 3/04166 |
| 2018/0365473 A1* | 12/2018 | Wang | .................. | G09G 3/3426 |
| 2019/0019000 A1* | 1/2019 | Lee | .......................... | G02B 5/20 |
| 2020/0320269 A1* | 10/2020 | Kim | ...................... | G06F 3/0416 |
| 2020/0342196 A1* | 10/2020 | Chang | .................. | G09G 3/3688 |
| 2021/0019035 A1* | 1/2021 | Yoo | ..................... | G06F 3/04166 |

FOREIGN PATENT DOCUMENTS

| | | |
|---|---|---|
| CN | 107402680 A | 11/2017 |
| CN | 111797671 A | 10/2020 |
| TW | 201928926 A | 7/2019 |

* cited by examiner

*Primary Examiner* — Lixi C Simpson
(74) *Attorney, Agent, or Firm* — Winston Hsu

(57) ABSTRACT

The present invention provides a method of controlling a display panel having a sensing area and a non-sensing area. The sensing area includes a plurality of fingerprint sensing pixels, each of which is coupled to at least one control line. The non-sensing area includes a plurality of dummy pixels, each of which is coupled to at least one dummy line. The method includes steps of: applying a control signal on a first control line among the at least one control line or configuring the first control line to be floating, and applying a first anti-loading driving (ALD) signal corresponding to the control signal on a first dummy line among the at least one dummy line or configuring the first dummy line to be floating.

18 Claims, 7 Drawing Sheets

METHOD OF CONTROLLING DISPLAY PANEL AND RELATED CONTROL CIRCUIT

CROSS REFERENCE TO RELATED APPLICATIONS

This application claims the benefit of U.S. Provisional Application No. 63/039,468, filed on Jun. 16, 2020, the contents of which are incorporated herein by reference.

BACKGROUND OF THE INVENTION

1. Field of the Invention

The present invention relates to a method of controlling a display panel, and more particularly, to a method of controlling a display panel having fingerprint sensing functions.

2. Description of the Prior Art

Fingerprint recognition technology is widely applied in a variety of electronic products such as a mobile phone, laptop, tablet, personal digital assistant (PDA), and portable electronics, for realizing identity recognition. The fingerprint sensing allows a user to perform identity recognition conveniently, where the user may only need to put his/her finger on a fingerprint sensing pad or area to login the electronic device instead of entering long and tedious username and password.

In a display panel having fingerprint sensing functions, the fingerprint sensing operations may be realized in partial of the active area of the display panel. For example, the active area may include a sensing area and a non-sensing area, where fingerprint sensing pixels are allocated in the sensing area, allowing the fingerprint image to be received through the sensing area. The non-sensing area does not need to perform fingerprint sensing, and thus there is no need to deploy fingerprint sensing pixels in the non-sensing area. However, due to the deployment of fingerprint sensing pixels, the loads in the sensing area and in the non-sensing area may be inconsistent, thus reducing the visual effects of the display panel. In addition, if the display panel is integrated with touch sensing functions, the touch sensing behavior may also be influenced by the inconsistent loading of the sensing area and non-sensing area. Thus, there is a need for improvement over the prior art.

SUMMARY OF THE INVENTION

It is therefore an objective of the present invention to provide a novel display panel structure and a related control method and control circuit, in order to solve the abovementioned problems.

An embodiment of the present invention discloses a method of controlling a display panel having a sensing area and a non-sensing area. The sensing area comprises a plurality of fingerprint sensing pixels, each of which is coupled to at least one control line. The non-sensing area comprises a plurality of dummy pixels, each of which is coupled to at least one dummy line. The method comprises steps of: applying a control signal on a first control line among the at least one control line or configuring the first control line to be floating, and applying a first anti-loading driving (ALD) signal corresponding to the control signal on a first dummy line among the at least one dummy line or configuring the first dummy line to be floating.

Another embodiment of the present invention discloses a control circuit for controlling a display panel having a sensing area and a non-sensing area. The sensing area comprises a plurality of fingerprint sensing pixels, each of which is coupled to at least one control line. The non-sensing area comprises a plurality of dummy pixels, each of which is coupled to at least one dummy line. The control circuit is configured to apply a control signal on a first control line among the at least one control line or configure the first control line to be floating, and apply a first ALD signal corresponding to the control signal on a first dummy line among the at least one dummy line or configure the first dummy line to be floating.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
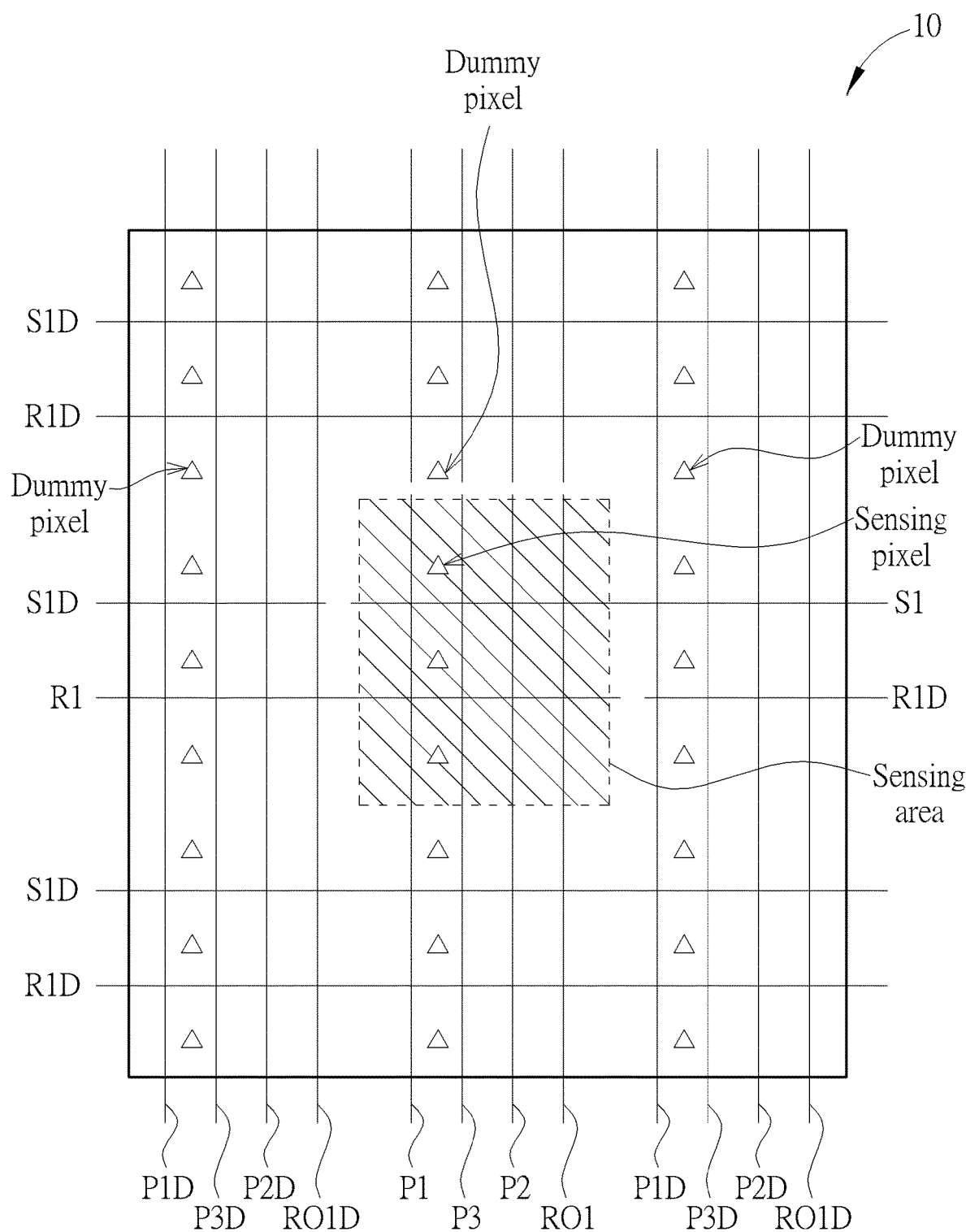
FIG. 1 is a schematic diagram of a display panel according to an embodiment of the present invention.
Figure 2:
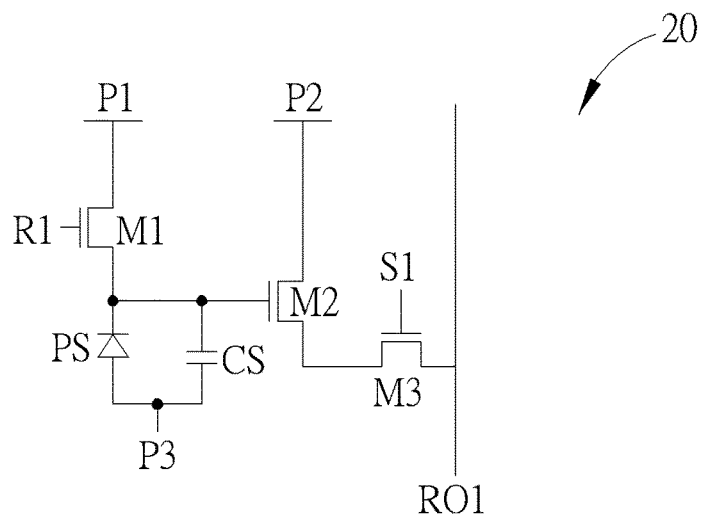
FIG. 2 shows an exemplary structure of a sensing pixel of the display panel.

Please refer to FIG. 1, which is a schematic diagram of a display panel 10 according to an embodiment of the present invention. FIG. 1 illustrates an active area of the display panel 10, which includes a sensing area and a non-sensing area, where the sensing area includes sensing pixels capable of fingerprint sensing operations, and the non-sensing area is not used to perform fingerprint sensing. In order to realize the fingerprint sensing functions, in the sensing area, multiple sensing pixels are deployed as a pixel array. The fingerprint images may be sensed according to signal distributions of the pixel array. FIG. 2 shows an exemplary structure of a sensing pixel 20 of the display panel 10, where the sensing pixel 20 includes a photo sensor PS, a storage capacitor CS and transistors M1-M3, as a 3 transistor active pixel sensor (3T APS) structure. The sensing pixel 20 may operate by receiving power supply and control signals from control lines including power lines P1-P3, a reset line R1 and a select line S1. A readout line RO1 is also coupled to the sensing pixel 20, for reading out sensing signals based on the exposure result of the photo sensor PS in the sensing pixel 20.

In an embodiment, the sensing pixel 20 is a fingerprint sensing pixel. The photo sensor PS may be a photodiode, which is configured to sense light and convert the sensed light intensity into an electronic signal (such as a voltage signal or current signal), and this operation is called "exposure". During the exposure period, the electronic signal may flow into the storage capacitor CS to be stored in the storage capacitor CS. The transistor M1, which may receive a reset signal from the reset line R1, is served as a reset transistor for resetting the electric charges stored in the storage capacitor CS before the exposure operation. The transistor M2 may be served as a source follower, for forwarding the electronic signal sensed by the photo sensor PS and stored in the storage capacitor CS to the readout line RO1 after the exposure operation is complete. The transistor M3 may be served as a select transistor, which may receive a corresponding select signal from the select line S1, to be turned on by the select signal when this pixel is selected.

Please note that the structure of the sensing pixel 20 shown in FIG. 2 is one of various implementations of the present invention. In another embodiment, other pixel structures may be feasible. For example, another sensing pixel of the present invention may include a photo sensor, a storage capacitor and only two transistors, to realize a more simplified circuit structure. The corresponding control lines may be deployed accordingly. For example, as shown in FIGS. 1 and 2, the control lines coupled to each sensing pixel in the sensing area may include the power lines P1-P3, the reset line R1, the select line S1 and the readout line RO1. In another embodiment, the control lines deployed on the display panel to be coupled to the sensing pixels may include at least one of the power lines P1-P3, the reset line R1, the select line S1 and the readout line RO1 according to system requirements, where one or more of these lines may be omitted if not necessary, and/or an additional control line may be included if necessary.

In general, if the sensing area is only partial of the entire display area of the display panel, the deployment of the sensing pixels in the sensing area may easily influence the visual effects. More specifically, the circuit devices such as the photo sensor PS, the storage capacitor CS and the transistors M1-M3 in the sensing pixels will cause that the sensing area may be visually different from the non-sensing area, which reduces the uniformity of visual effects. For example, the circuit devices included in the sensing pixels may block light emissions, causing that the image shown in the sensing area may be slightly darker than the image shown in the non-sensing area.

In addition, if the display panel is integrated with touch sensing functions, the touch sensing behavior may also be influenced by the sensing pixels. In general, in the display panel having touch sensing and fingerprint sensing functions, the touch sensor layer having a touch sensor array and the fingerprint sensor layer having a fingerprint sensor array (composed of sensing pixels as shown in FIGS. 1 and 2) may be superposed on and integrated with the display layer composed of display pixels, and the touch sensor layer is usually close to the fingerprint sensor layer. Therefore, there may be a non-ignorable coupling capacitor between the conducting lines of the touch sensor and the control lines of the fingerprint sensing pixels, and a non-ignorable coupling capacitor between the sensing electrodes of the touch sensor and the control lines of the fingerprint sensing pixels. The coupling capacitors may generate non-ignorable loads on both the touch sensing operations and fingerprint sensing operations. The loads may degrade the touch sensing signals and the fingerprint sensing signals. Further, the fingerprint sensor layer may also be close to the display pixels of the display panel; hence, the coupling capacitor between the fingerprint sensor layer and the display pixels may also generate non-ignorable loads on the fingerprint sensing operations.

Referring back to FIG. 1, in order to improve the uniformity of visual effects of the display panel 10, there may be several dummy pixels deployed in the non-sensing area. Each of the dummy pixels is coupled to dummy lines including at least one of dummy power lines P1D-P3D, a dummy reset line R1D, a dummy select line S1D and a dummy readout line RO1D, to be corresponding to the control lines coupled to the sensing pixels in the sensing area. The dummy lines may generate a load substantially equivalent to the load generated by the control lines, and the structure of each dummy pixel may generate a load substantially equivalent to the load generated by a sensing pixel. With the dummy pixels and dummy lines deployed in the non-sensing area, the loads of the non-sensing area may be identical to or similar to the loads of the sensing area, which improves the loading uniformity of the display panel 10. Each dummy pixel may include a dummy photo sensor, a dummy storage capacitor and corresponding dummy transistors. Note that the dummy pixels are not used to perform fingerprint sensing. Therefore, in another embodiment, the dummy photo sensor and/or the dummy storage capacitor may be replaced by equivalent circuit devices capable of generating identical loads. Similarly, the transistors may also be replaced by equivalent circuit devices to realize the loads as equivalent to the sensing pixels.

Figure 3A:
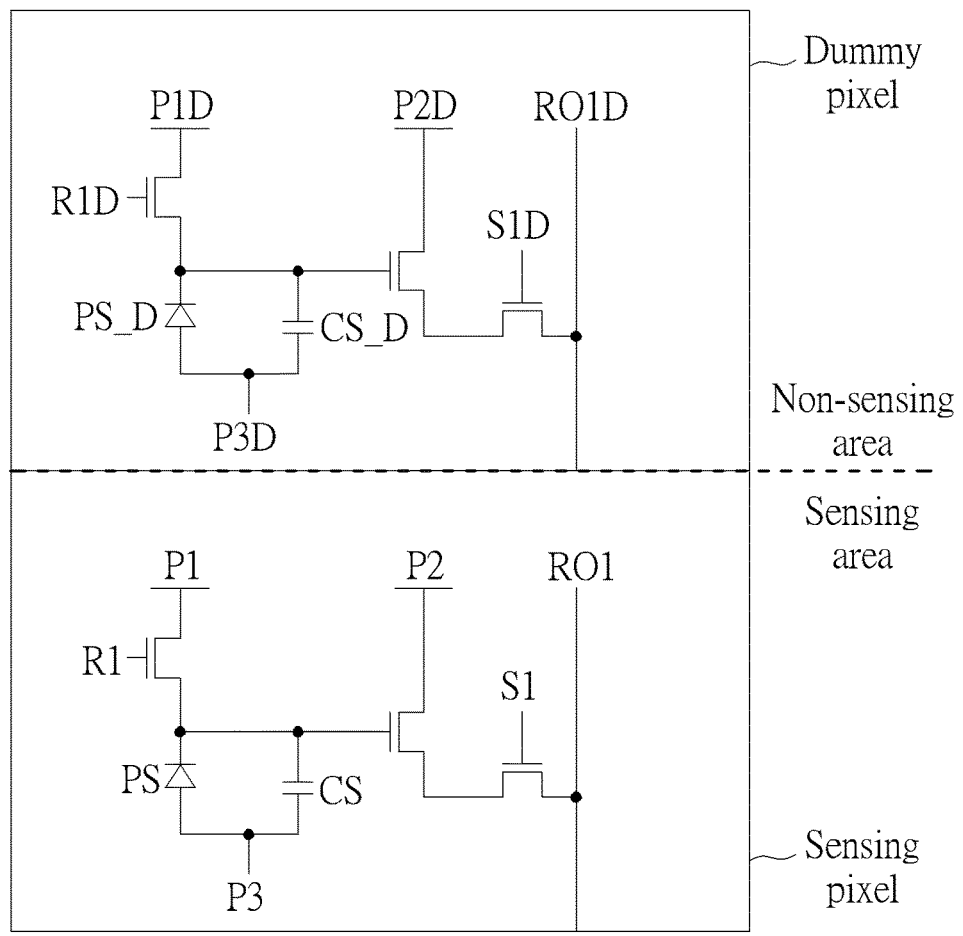
FIGS. 3A-3D are schematic diagrams of the circuit structure of the dummy pixel according to embodiments of the present invention.

Please refer to FIGS. 3A-3D, which are schematic diagrams of the circuit structure of the dummy pixel according to embodiments of the present invention. As shown in FIG. 3A, the circuit structure of the dummy pixel in the non-sensing area may be exactly identical to the circuit structure of the sensing pixel in the sensing area. In this embodiment, both the sensing pixel and the dummy pixel include a photo sensor, a storage capacitor and three transistors. The sensing pixel is coupled to the power lines P1-P3, the reset line R1, the select line S1 and the readout line RO1, and the dummy pixel is correspondingly coupled to the dummy power lines P1D-P3D, the dummy reset line R1D, the dummy select line S1D and the dummy readout line RO1D. Since the circuit structure and line connections of the sensing pixel and the dummy pixel are exactly identical, the loads generated by the sensing pixel and the dummy pixel are equivalent.

Figure 3B:
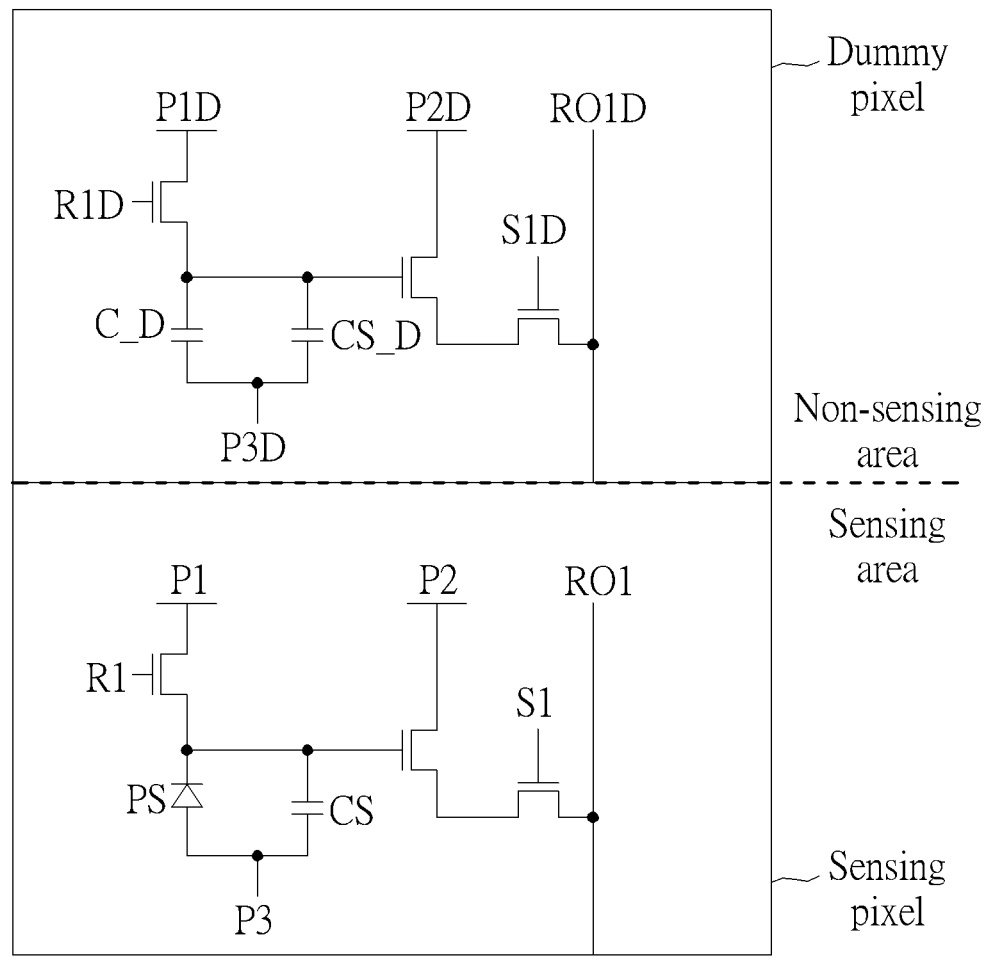

FIG. 3B illustrates another implementation of the dummy pixel, where the dummy photo sensor PS_D shown in FIG. 3A is replaced by a dummy capacitor C_D. The dummy capacitor C_D may generate identical or similar capacitive loads as the photo sensor PS_D, allowing the overall loads of the dummy pixel to be identical to the overall loads of the sensing pixel.

Figure 3C:
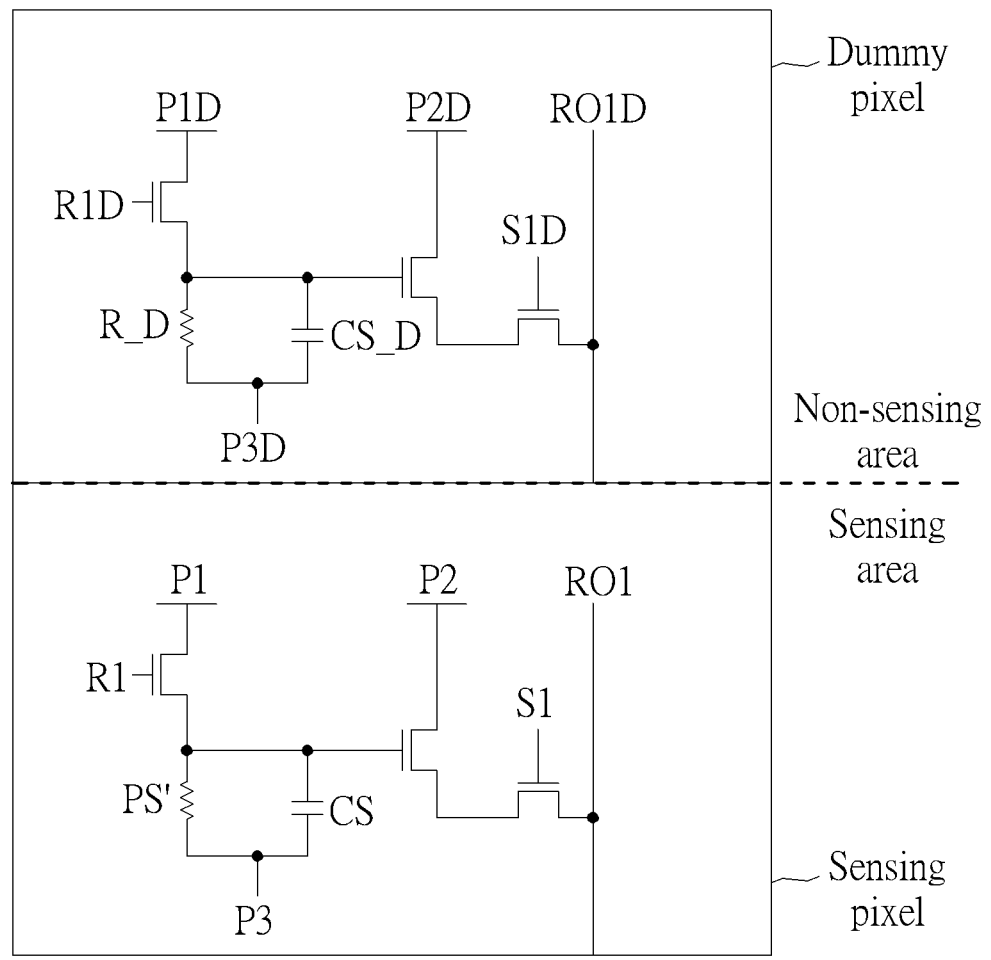

FIG. 3C illustrates a further implementation of the dummy pixel, where the dummy photo sensor PS_D shown in FIG. 3A is replaced by a dummy resistor R_D. In this embodiment, the photo sensor PS' may be a resistive-type photo sensor, which is preferably emulated by the dummy resistor R_D. The dummy resistor R_D may generate identical or similar resistive loads as the photo sensor PS_D, allowing the overall loads of the dummy pixel to be identical to the overall loads of the sensing pixel.

Figure 3D:
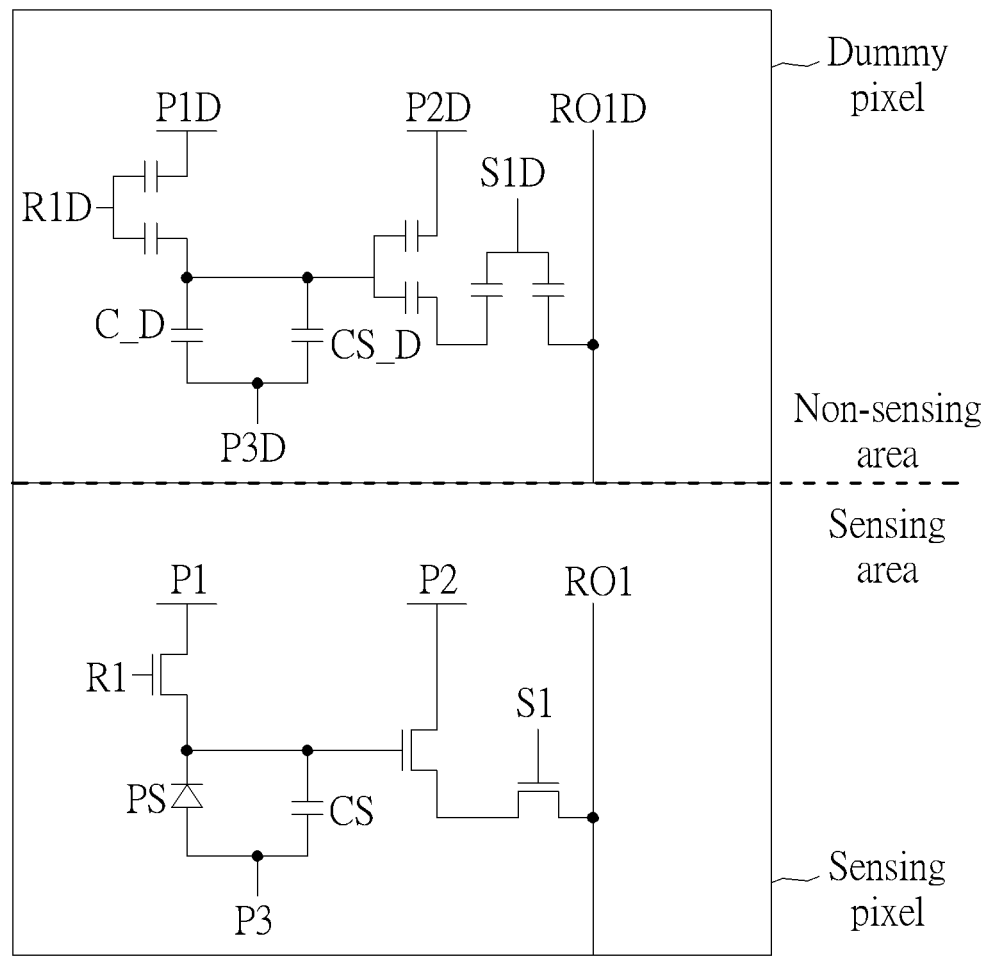

In another embodiment, if it is not feasible to implement transistors in non-sensing area, equivalent circuit devices may be applied to replace the transistors in the dummy pixel. As shown in FIG. 3D, each transistor is replaced by two capacitors, for emulating the gate-to-source capacitor and the gate-to-drain capacitor of the transistor, respectively. The capacitors may generate identical or similar capacitive loads as the transistor. An additional dummy capacitor is used to emulate the capacitive loads of the photo sensor. Therefore, the overall loads of the dummy pixel would be identical to the overall loads of the sensing pixel.

The implementations and connections of the dummy lines may also be realized in various manners. Referring back to FIG. 1, the power lines P1-P3 and the readout line RO1 are deployed along the vertical direction, and correspondingly, the dummy power lines P1D-P3D and the dummy readout line RO1D are deployed along the vertical direction. The select line S1 and the reset line R1 are deployed along the horizontal direction, and correspondingly, the dummy select line SID and the dummy reset line RID are deployed along the horizontal direction. Each control line for the sensing pixels is coupled to a control circuit (not illustrated) such as a fingerprint, touch and display integration (FTDI) circuit through one or both terminals, to receive control signals from the control circuit. Each dummy line for the dummy pixels may also be coupled to the control circuit through one or both terminals.

In order to realize the fingerprint sensing operations, the control circuit may include a column driver disposed at the bottom of the display panel 10, for providing power signals through the power lines P1-P3 along the vertical direction. The control circuit may also include a row driver disposed at the left-hand side or right-hand side of the display panel 10, for providing control signals through the select line S1 and the reset line R1 along the horizontal direction. The control circuit may further include a sensing circuit, which may receive fingerprint sensing signals from the readout line RO1. As shown in FIG. 1, each of the power lines P1-P3 passes through the entire sensing area along the vertical direction, in order to supply power signals to a column of sensing pixels. The readout line RO1 also passes through the entire sensing area along the vertical direction, in order to forward the sensing signals of a column of sensing pixels. The reset line R1 and the select line S1 pass through the entire sensing area along the horizontal direction to be coupled to a row of sensing pixels; hence, the sensing pixels may be selected row by row to read out the sensing results.

In an embodiment, each control line may be selectively terminated at the boundary of the sensing area, or extended to the boundary of the active area of the display panel 10 (i.e., extended to the outside boundary of the non-sensing area). As shown in FIG. 1, the power lines P1-P3 and the readout line RO1 are extended to the boundary of the active area at the bottom side to be coupled to the control circuit. The power lines P1-P3 and the readout line RO1 are terminated at the top boundary of the sensing area, so as to reduce the loads of these control lines by cutting down unnecessary parts. The upper extended spaces of these control lines are deployed with several dummy lines, so as to improve the loading uniformity. Similarly, the select line S1 is extended to the boundary of the active area at the right-hand side to be coupled to the control circuit, while terminated at the left boundary of the sensing area so as to reduce the loads. The reset line R1 is extended to the boundary of the active area at the left-hand side to be coupled to the control circuit, while terminated at the right boundary of the sensing area so as to reduce the loads. The left extended space of the select line S1 and the right extended space of the reset line R1 are correspondingly filled with a dummy select line and a dummy reset line, respectively.

In another embodiment, a control line may not be terminated at the boundary of the sensing area; instead, this control line may be extended to both sides of the active area according to system requirements. For example, the control line extended to both sides of the active area may receive control signals at both sides so as to improve the signal integrity.

In another embodiment, the control lines and the dummy lines may be deployed in other manner. For example, in the above embodiment, the select line S1 and the reset line R1 and their corresponding dummy select line SID and dummy reset line RID are deployed along the horizontal direction. In another embodiment, the select line S1 and/or the reset line R1 may be deployed along the vertical direction to be connected to the control circuit disposed at the top and/or bottom of the display panel 10. In such a situation, the dummy select line SID and the dummy reset line RID may also be deployed along the vertical direction correspondingly. Similarly, one or more of the power lines P1-P3 and the readout line RO1 may be deployed along the horizontal direction, and the corresponding dummy lines may be deployed along the horizontal direction correspondingly. In addition, any of these control lines and dummy lines may be deployed with curves and/or corners according to system requirements. For example, a line may have a roundabout route to prevent the photo sensors from being blocked. The control lines and the dummy lines of the present invention have various implementations, which are not limited herein.

As mentioned above, the control lines and the dummy lines are coupled to the control circuit. Therefore, the control circuit may send control signals through the control lines to perform fingerprint sensing, and also send corresponding signals through the dummy lines to further reduce the loading and improve the loading uniformity.

In an embodiment, when the control circuit applies a control signal on any of the control lines, the control circuit may apply an anti-loading driving (ALD) signal on the corresponding dummy lines, where the ALD signal may correspond to the control signal. More specifically, at least one of the frequency, phase and amplitude of the ALD signal may be substantially identical to the frequency, phase and amplitude of the control signal, respectively. In a preferable embodiment, the ALD signal sent to the dummy lines may be exactly the same as the control signal sent to the control lines, so that the loads generated by the dummy lines may be equivalent to the loads generated by the control lines.

Figure 4:
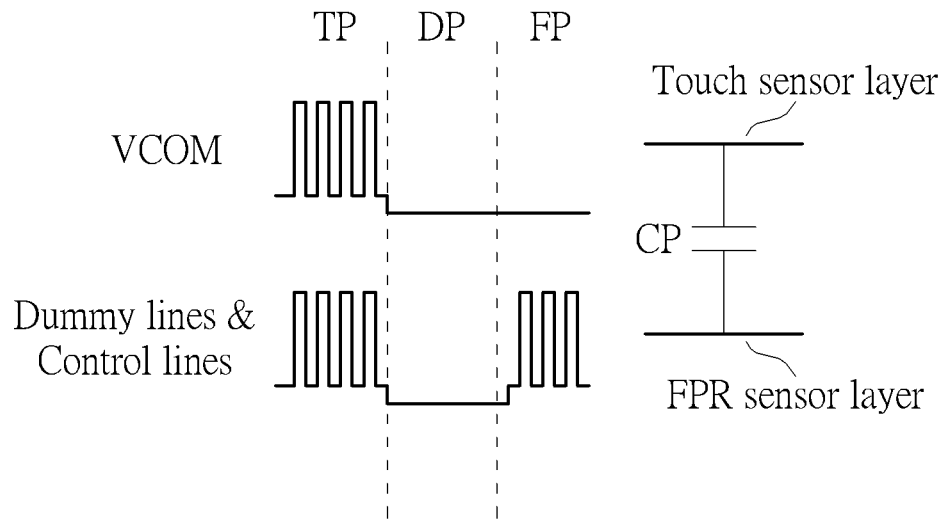
FIGS. 4-6 are waveform diagrams of the control signals sent to the display panel according to an embodiment of the present invention.

Please refer to FIG. 4, which is a waveform diagram of the control signals sent to the display panel 10 according to an embodiment of the present invention. In this embodiment, the display pixels are coupled to a common electrode VCOM, which is also shared by the touch sensing operations. In other words, the common electrode VCOM of the display pixels is served as the touch sensing electrode in the display panel 10. As mentioned above, there is a coupling capacitor CP between the touch sensor layer where the touch sensing electrode is disposed and the fingerprint (FPR) sensor layer where the fingerprint sensing pixels are disposed. The coupling capacitor CP may generate loads to affect both the touch operations and fingerprint sensing operations.

In order to reduce the interferences between display, touch sensing and fingerprint sensing operations, their operations may be performed based on time division. Therefore, the operations of the display panel 10 are separated into a touch operation period (TP), a display period (DP) and a fingerprint sensing period (FP), as shown in FIG. 4. The control circuit may send control signals to the control lines (and the fingerprint sensing pixel) and send ALD signals to the dummy lines (and the dummy pixel), where the control signals and the ALD signals are exactly identical and may have the same waveform. The control circuit may further send control signals to the common electrode VCOM.

In detail, during the touch operation period TP, the touch signals are applied on the common electrode VCOM, which is served as a touch sensing electrode. Meanwhile, the control circuit may apply the ALD signals on the dummy lines and the control lines on the fingerprint sensor layer. More specifically, the ALD signals may be applied to any one or multiple of the power lines, the reset line, the select line and the readout line, and their corresponding dummy lines. In such a situation, at least one of the frequency, phase and amplitude of the ALD signals may be substantially identical to the frequency, phase and amplitude of the touch signals, respectively. If the ALD signals are exactly the same as the touch signals, the coupling capacitor CP between the fingerprint sensor layer and the touch sensor layer may not generate any loads on the touch operation of the touch operation period TP.

During the display period DP, the common electrode VCOM may receive a common voltage from the control circuit. Meanwhile, the control circuit may apply a constant voltage on the dummy lines and the control lines on the fingerprint sensor layer. More specifically, the constant voltage may be applied to any one or multiple of the power lines, the reset line, the select line and the readout line, and their corresponding dummy lines. Since both the common electrode VCOM (i.e., the touch sensing electrode) and the fingerprint sensor receive a constant voltage, the coupling capacitor CP between the fingerprint sensor layer and the touch sensor layer may not generate any loads on the display operation of the display period DP.

During the fingerprint sensing period FP, the control lines coupled to the sensing pixels in the fingerprint sensing area may be applied with control signals. Meanwhile, the dummy lines coupled to the dummy pixels in the non-sensing area may be applied with ALD signals identical to the control signals. With similar circuit implementations and signal patterns between the fingerprint sensing area and the non-sensing area, the fingerprint sensor layer may produce uniform loads on every position of the display panel 10, so that the visual effects of the display panel 10 may be uniform.

Figure 5:
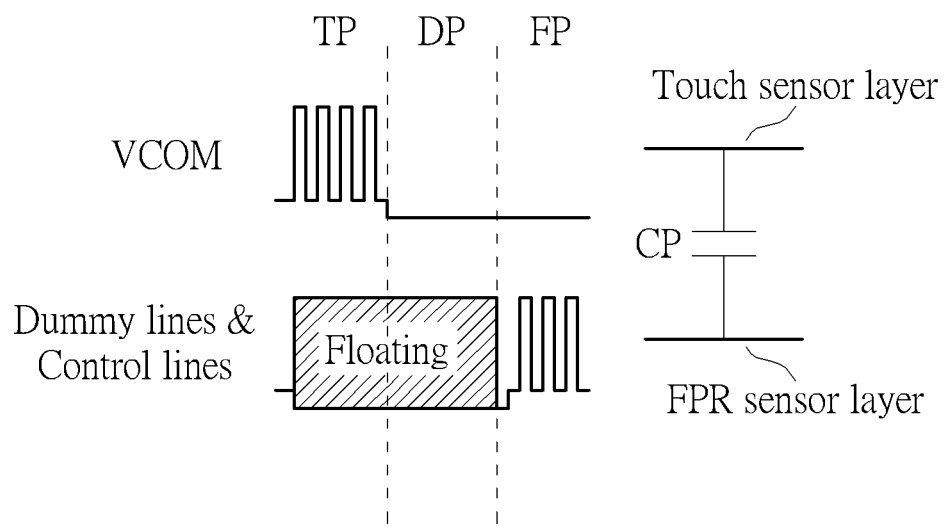

Please refer to FIG. 5, which is another waveform diagram of the control signals sent to the display panel 10 according to an embodiment of the present invention. Similarly, in this embodiment, the display pixels and the touch sensing operations share the same common electrode VCOM.

In order to alleviate or eliminate the loads of the coupling capacitor CP between the fingerprint sensor layer and the touch sensor layer, the control lines coupled to the sensing pixels and the dummy lines coupled to the dummy pixels may be configured to be floating. In detail, during the touch operation period TP where the common electrode VCOM (served as the touch sensor) is applied with the touch signals and during the display period DP where the common electrode VCOM is applied with the common voltage, both the control lines and the dummy lines are configured to be floating. A control line or dummy line may be floating when every terminal of this line is only connected to high impedance node(s), or any external connection of this line is cut off. The floating status allows the voltage of the line to shift upward or downward following the pulses in the touch signals due to the coupling capacitor CP, thereby alleviating or eliminating the loads generated by the coupling capacitor CP.

Please note that the floating status of the control lines and dummy lines may be realized in any possible manner. For example, in an embodiment, a control line or dummy line is configured to be in the floating status when the control circuit outputs high impedance to this line. In another embodiment, each of the control lines and the dummy lines may be coupled to the control circuit through a switch, and the control circuit is configured to control the status of the switch. A control line or dummy line is configured to be floating when the corresponding switch is turned off. Alternatively, several or all of the control lines and the dummy lines may be connected together and controlled by a master switch. There are various implementations for realizing the floating status of the present invention, which are not limited to those described in this disclosure.

Figure 6:
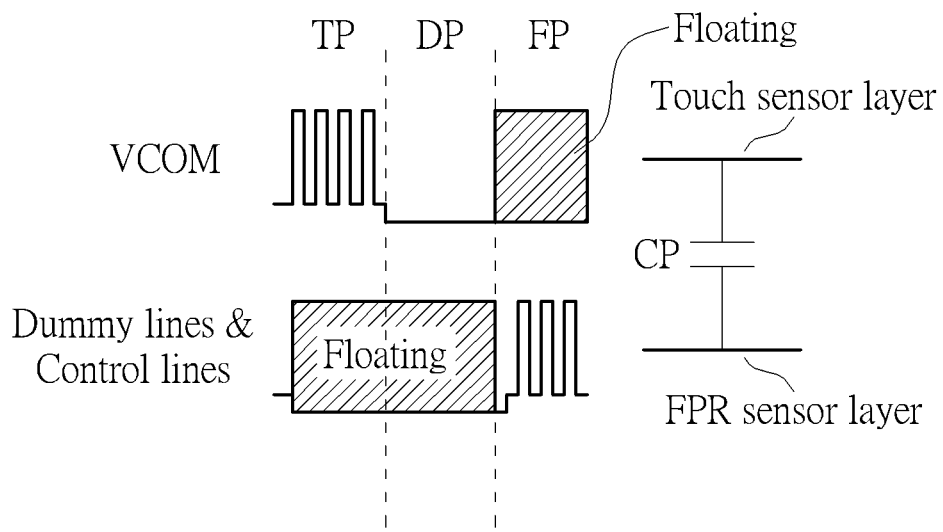

Please refer to FIG. 6, which is a further waveform diagram of the control signals sent to the display panel 10 according to an embodiment of the present invention. The operations of the display panel 10 as shown in FIG. 6 are similar to those shown in FIG. 5. Their difference is that the common electrode VCOM shown in FIG. 6 is configured to be floating when the ALD signals and the control signals are applied to the dummy lines and the control lines during the fingerprint sensing period FP. As mentioned above, due to the coupling capacitor CP between the touch sensor layer and the fingerprint sensor layer, there may be non-ignorable loads affecting the fingerprint sensing signals. In this embodiment, the common electrode VCOM is configured to be floating during the fingerprint sensing period FP, so that the loads of fingerprint sensing may be alleviated or eliminated. Alternatively, the common electrode VCOM may be applied with an ALD signal having identical frequency, phase and/or amplitude as the fingerprint control signal when the control signals for fingerprint sensing are applied during the fingerprint sensing period FP, where the loads of fingerprint sensing may also be alleviated or eliminated.

Please note that the present invention aims at providing a method of controlling a display panel and a related control circuit such as an FTDI circuit, where the display panel has a fingerprint sensor for realizing fingerprint sensing functions, and the fingerprint sensor has a sensing area composed of sensing pixels being connected to the control circuit through sensing lines and a non-sensing area composed of dummy pixels being connected to the control circuit through dummy lines. Those skilled in the art may make modifications and alterations accordingly. For example, in the above embodiments, the display panel is integrated with touch sensing functions and the common electrode of display pixels is served as a touch sensing electrode to be used in the touch sensing operations. In another embodiment, the common electrode of display pixels and the touch sensing electrode are separated electrodes. In such a situation, one or both of the common electrode and the touch sensing electrode may be applied with the ALD signal or configured to be floating to reduce the capacitive loads.

In addition, in the deployment of the fingerprint sensor layer, it is preferable to make the loads of the non-sensing area to be close to or equivalent to the loads of the fingerprint sensing area, so that there is no evident difference on the display image between the sensing area and the non-sensing area, and the touch behavior will be uniform between the sensing area and the non-sensing area. Therefore, higher similarity between the circuit structures of the non-sensing area and the sensing area and higher similarity between the control signals applied to the control lines and the ALD signals applied to the dummy lines are preferable. However, as long as the non-sensing area includes a dummy pixel having a circuit structure that can generate similar or equivalent loading as the sensing pixel and/or includes a dummy line corresponding to any of the control lines of the sensing area, where the dummy line is applied with an ALD signal corresponding to the control signal or configured to be floating, the related implementations should belong to the scope of the present invention.

In the embodiments of the present invention, the ALD driving or the floating control may be selectively used in each of the display period, touch operation period and fingerprint sensing period. For example, the ALD driving may be used in the touch operation period to emulate the signal toggles of the touch signal, and used in the fingerprint sensing period to emulate the fingerprint control signal, while the corresponding lines are controlled to be floating during the display period.

In addition, the ALD signal may be selectively applied to any of the fingerprint control lines, the dummy lines, the common electrode of display pixels and the touch sensing electrodes, and/or these lines and electrodes may be configured to be floating, in order to reduce the capacitive loading. That is, any combinations of ALD driving and floating control are feasible to these lines and electrodes. For example, during the touch operation period where the touch sensing electrodes receive the touch signals, the fingerprint control lines are applied with the ALD signal and the dummy lines are configured to be floating, or the fingerprint control lines are configured to be floating and the dummy lines are applied with the ALD signal. Alternatively, several of the control lines are applied with the ALD signal, and any other control lines not applied with the ALD signal are configured to be floating. Similarly, several of the dummy lines are applied with the ALD signal, and any other dummy lines not applied with the ALD signal are configured to be floating. In short, by applying the ALD signals or making the lines or electrodes floating, or using various permutations and combinations of these two technical means, the interferences of signal coupling between the touch sensor and the fingerprint sensor may be minimized.

Figure 7:
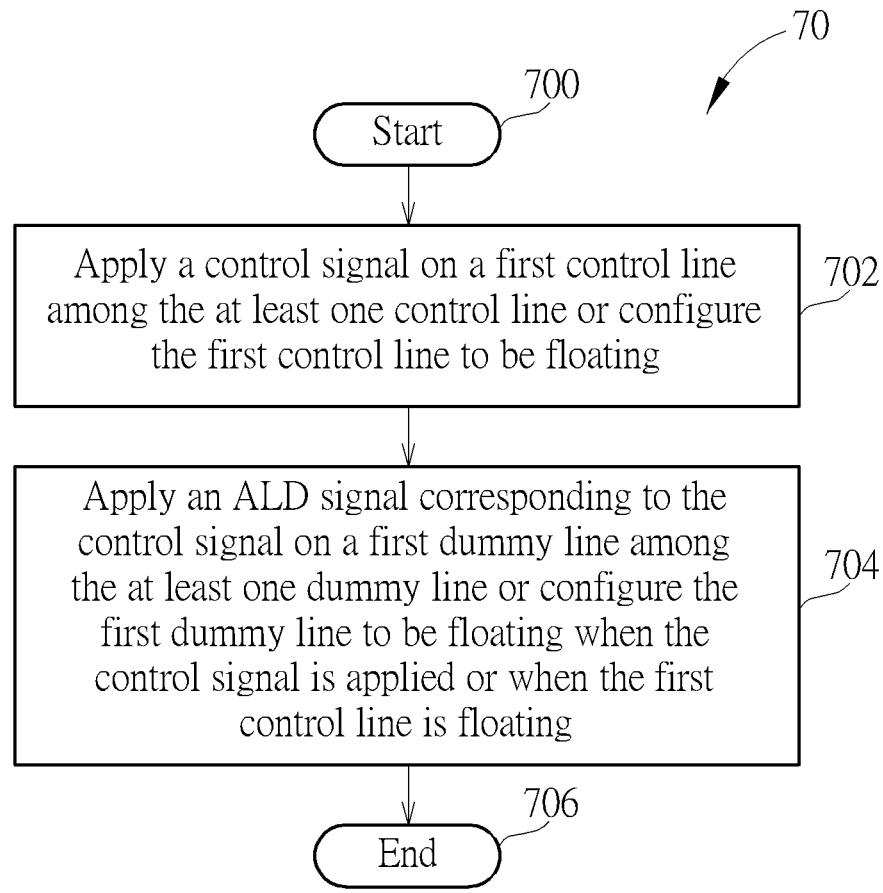
FIG. 7 is a flowchart of a process according to an embodiment of the present invention.

The abovementioned operations of the fingerprint sensor and the related control circuit may be summarized into a process 70. The process 70, which may be realized in the control circuit, may be performed on the fingerprint sensor integrated in a display panel. The active area of the display panel has a fingerprint sensing area including a plurality of sensing pixels and a non-sensing area including a plurality of dummy pixels, where the sensing pixels are coupled to the control circuit through at least one control line and the dummy pixels are coupled to the control circuit through at least one dummy line. As shown in FIG. 7, the process 70 includes the following steps:

Step 700: Start.

Step 702: Apply a control signal on a first control line among the at least one control line or configure the first control line to be floating.

Step 704: Apply an ALD signal corresponding to the control signal on a first dummy line among the at least one dummy line or configure the first dummy line to be floating when the control signal is applied or when the first control line is floating.

Step 706: End.

The detailed implementations and alterations of the process 70 are illustrated in the above paragraphs, and will not be narrated herein.

To sum up, the embodiments of the present invention provide a method of controlling a display panel having a sensing function and a related control circuit. The display panel has a sensing area where sensing is performed and has a non-sensing area without the sensing function. The sensing function may be a fingerprint sensing function. The sensing area includes a plurality of sensing pixels, which are coupled to the control circuit through control line(s). To achieve uniform loading, the non-sensing area is deployed with a plurality of dummy pixels, which are coupled to the control circuit through dummy line(s) corresponding to the control line(s). The structure of the dummy pixels may be exactly the same as the structure of the sensing pixels, and/or include circuit devices capable of generating loads equivalent to the loads of the sensing pixels. The sensing pixels, dummy pixels and related control lines and dummy lines may be applied with ALD signals and/or configured to be floating, so as to alleviate or eliminate the loading of the sensing operation. The ALD driving and the floating control may be selectively applied to any of the control lines and the dummy lines. As for a display panel integrated with the touch sensing and fingerprint sensing functions and controlled by the FTDI circuit, the ALD driving and the floating control may be selectively performed in each of the display period, touch operation period and fingerprint sensing period. As a result, the loading of the sensing area and the non-sensing area of the display panel may become uniform with the deployment of the dummy pixels and corresponding dummy lines in the non-sensing area. Also, the loading may be minimized by performing the ALD driving and floating control schemes on the sensing area and the non-sensing area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling a display panel having a sensing area and a non-sensing area, the sensing area comprising a plurality of fingerprint sensing pixels, each coupled to at least one control line, and the non-sensing area comprising a plurality of dummy pixels, each coupled to at least one dummy line, the method comprising:

applying a control signal on a first control line among the at least one control line or configuring the first control line to be floating;

applying a first anti-loading driving (ALD) signal corresponding to the control signal on a first dummy line among the at least one dummy line or configuring the first dummy line to be floating;

applying the control signal on the first control line during a fingerprint sensing period; and applying a third ALD signal on a common electrode of display pixels of the display panel or configuring the common electrode to be floating when the control signal is applied.

2. The method of claim 1, wherein at least one of a frequency, a phase and an amplitude of the first ALD signal is substantially identical to a frequency, a phase and an amplitude of the control signal, respectively.

3. The method of claim 1, wherein each of the plurality of dummy pixels has a structure identical to a structure of one of the plurality of sensing pixels.

4. The method of claim 1, wherein each of the plurality of dummy pixels has a structure generating a load substantially equivalent to a load generated by one of the plurality of sensing pixels.

5. The method of claim 1, wherein the at least one control line comprises at least one of a first power line, a second power line, a third power line, a reset line, a select line and a readout line, and the at least one dummy line comprises at least one of a first dummy power line, a second dummy power line, a third dummy power line, a dummy reset line, a dummy select line and a dummy readout line.

6. The method of claim 1, further comprising:

applying a touch signal on a touch sensor of the display panel during a touch operation period; and applying a second ALD signal on the first dummy line or configuring the first dummy line to be floating when the touch signal is applied.

7. The method of claim 6, wherein at least one of a frequency, a phase and an amplitude of the second ALD signal is substantially identical to a frequency, a phase and an amplitude of the touch signal, respectively.

8. The method of claim 1, further comprising:
applying a common voltage on the common electrode during a display period; and
applying a constant voltage on the first dummy line or configuring the first dummy line to be floating when the common voltage is applied.

9. The method of claim 1, wherein at least one of a frequency, a phase and an amplitude of the third ALD signal is substantially identical to a frequency, a phase and an amplitude of the control signal, respectively.

10. A control circuit for controlling a display panel having a sensing area and a non-sensing area, the sensing area comprising a plurality of fingerprint sensing pixels, each coupled to at least one control line, and the non-sensing area comprising a plurality of dummy pixels, each coupled to at least one dummy line, the control circuit being configured to:
apply a control signal on a first control line among the at least one control line or configure the first control line to be floating;
apply a first anti-loading driving (ALD) signal corresponding to the control signal on a first dummy line among the at least one dummy line or configure the first dummy line to be floating;
apply the control signal on the first control line during a fingerprint sensing period; and
apply a third ALD signal on a common electrode of display pixels of the display panel or configure the common electrode to be floating when the control signal is applied.

11. The control circuit of claim 10, wherein at least one of a frequency, a phase and an amplitude of the first ALD signal is substantially identical to a frequency, a phase and an amplitude of the control signal, respectively.

12. The control circuit of claim 10, wherein each of the plurality of dummy pixels has a structure identical to a structure of one of the plurality of sensing pixels.

13. The control circuit of claim 10, wherein each of the plurality of dummy pixels has a structure generating a load substantially equivalent to a load generated by one of the plurality of sensing pixels.

14. The control circuit of claim 10, wherein the at least one control line comprises at least one of a first power line, a second power line, a third power line, a reset line, a select line and a readout line, and the at least one dummy line comprises at least one of a first dummy power line, a second dummy power line, a third dummy power line, a dummy reset line, a dummy select line and a dummy readout line.

15. The control circuit of claim 10, further being configured to:
apply a touch signal on a touch sensor of the display panel during a touch operation period; and
apply a second ALD signal on the first dummy line or configure the first dummy line to be floating when the touch signal is applied.

16. The control circuit of claim 15, wherein at least one of a frequency, a phase and an amplitude of the second ALD signal is substantially identical to a frequency, a phase and an amplitude of the touch signal, respectively.

17. The control circuit of claim 10, further being configured to:
apply a common voltage on the common electrode during a display period; and
apply a constant voltage on the first dummy line or configure the first dummy line to be floating when the common voltage is applied.

18. The control circuit of claim 10, wherein at least one of a frequency, a phase and an amplitude of the third ALD signal is substantially identical to a frequency, a phase and an amplitude of the control signal, respectively.

* * * * *